(12) United States Patent
Huang et al.

(10) Patent No.: US 7,938,977 B2
(45) Date of Patent: May 10, 2011

(54) METHOD OF MODULATING RESONANT FREQUENCY OF TORSIONAL MEMS DEVICE

(75) Inventors: Long-Sun Huang, Taipei (TW);
Hsien-Lung Ho, Taipei (TW)

(73) Assignee: Touch Micro-System Technology Corp., Yang-Mei, Taoyuan Hsien (TW)

( * ) Notice: Subject to any disclaimer, the term of this patent is extended or adjusted under 35 U.S.C. 154(b) by 0 days.

(21) Appl. No.: 12/703,747

(22) Filed: Feb. 10, 2010

(65) Prior Publication Data

US 2010/0134870 A1 Jun. 3, 2010

Related U.S. Application Data

(62) Division of application No. 12/202,312, filed on Aug. 31, 2008, now abandoned.

(30) Foreign Application Priority Data

Jul. 2, 2008 (TW) ................................ 97124873 A

(51) Int. Cl.
*C23F 1/00* (2006.01)
*H02K 7/00* (2006.01)
*H02N 1/00* (2006.01)
(52) U.S. Cl. .................. 216/79; 216/6; 216/58; 216/72; 310/309; 310/66; 318/116; 359/290
(58) Field of Classification Search .................. 359/223, 359/224, 290–292, 295, 298, 318; 216/2, 216/33, 24, 6, 58, 72, 79; 318/116; 310/66, 90, 309, 36, 12.03, 12.04, 12.15, 12.27, 12.31; 156/60; 257/415, 420
See application file for complete search history.

(56) References Cited

U.S. PATENT DOCUMENTS

| | | | | |
|---|---|---|---|---|
| 5,552,924 A * | 9/1996 | Tregilgas | ................... | 359/224.1 |
| 6,107,115 A * | 8/2000 | Atobe et al. | ................... | 438/72 |
| 6,175,443 B1 * | 1/2001 | Aksyuk et al. | ................... | 359/291 |
| 2003/0016435 A1 * | 1/2003 | Atobe et al. | ................... | 359/295 |
| 2003/0025982 A1 * | 2/2003 | Wang et al. | ................... | 359/290 |
| 2004/0060898 A1 * | 4/2004 | Tsai | ................... | 216/2 |
| 2004/0165250 A1 * | 8/2004 | Aubuchon | ................... | 359/292 |
| 2004/0169910 A1 * | 9/2004 | Mehrl | ................... | 359/290 |
| 2006/0227405 A1 * | 10/2006 | Regan | ................... | 359/290 |
| 2007/0091415 A1 | 4/2007 | Tsuboi | | |
| 2007/0097487 A1 * | 5/2007 | Yang et al. | ................... | 359/291 |
| 2009/0322260 A1 * | 12/2009 | Lee | ................... | 318/116 |

\* cited by examiner

*Primary Examiner* — Evelyn A. Lester
(74) *Attorney, Agent, or Firm* — Winston Hsu; Scott Margo

(57) ABSTRACT

A torsional MEMS device is disclosed. The torsional MEMS device includes a support structure, a platform, and at least two hinges, which connects the platform to the support structure. The platform has an active area and a non-active area. A plurality of sacrificial elements is disposed in the non-active area. If the resonant frequency of the torsional MEMS device is less than a predetermined standard resonant frequency of the torsional MEMS device, at least one sacrificial element is removed to reduce the total mass of the torsional MEMS device, and so as to increase the resonant frequency of the torsional MEMS device.

10 Claims, 6 Drawing Sheets

METHOD OF MODULATING RESONANT FREQUENCY OF TORSIONAL MEMS DEVICE

CROSS REFERENCE TO RELATED APPLICATIONS

This application is a division of application Ser. No. 12/202,312 filed on Aug. 31, 2008, now abandoned.

BACKGROUND OF THE INVENTION

1. Field of the Invention

The present invention is related to a torsional MEMS device, and particularly, to a torsional MEMS device of adjustable resonant frequency.

2. Description of the Prior Art

In the past years, MEMS devices have been developed for miniaturization of mechanical devices. The MEMS devices are manufactured by processes used for forming integrated circuits. Typical MEMS devices, including micro-gears, micro-levers, and micro-valves, are operated in company with related electrical circuits to form several devices, such as accelerometers, pressure and chemical sensors, and actuators.

MEMS devices are formed using silicon as material. The silicon materials are processed by several semiconductor processes to form the structures of the MEMS devices. For example, torsional MEMS devices use hinge as the motive structure. The figure of the hinge is a major factor for determining the resonant frequency of the torsional MEMS devices. In addition, resonant frequency is also a major factor for determining the performance of the torsional MEMS device. Therefore, several processes are performed to manufacture the hinge and to modify the hinge having desirable resonant frequency. It is appreciated that demands of the resonant frequency of the torsional MEMS device is getting more accurate, and it is getting difficult to form the hinge of determined shape by a simple lithography process or an etch process at present. As a result, applicant provides a torsional MEMS device which the resonant frequency of the torsional MEMS device may be adjusted to overcome the limitation resulted from the present processes for forming the conventional torsional MEMS devices. Additionally, the resonant frequency of the torsional MEMS device of the present invention may be adjusted after the manufacturing processes to fulfill the standard resonant frequency of the product.

SUMMARY OF THE INVENTION

It is therefore a primary objective of the present invention to provide a torsional MEMS device and the method of modulating the resonant frequency of the torsional MEMS device for fulfilling the requirement of providing advanced products.

According to the present invention, a torsional MEMS device having a support structure, a platform, and at least two hinges is provided. The support structure has a space where the platform is placed. The platform and the support structure are connected by the hinges, which are arranged along a first direction that passes through the mass center of the platform. The platform includes an active area and a non-active area, and a plurality of sacrificial elements disposed in the non-active area, in which the sacrificial elements are used for modulating the resonant frequency of the torsional MEMS device.

According to the present invention, a method of modulating the resonant frequency of a torsional MEMS device is disclosed. A torsional MEMS device having a support structure, a platform, and at least two hinges connecting the support structure and the platform is provided. The platform includes an active area and a non-active area, wherein a plurality of sacrificial elements is disposed in the non-active area. A resonant frequency test is performed to measure a raw resonant frequency of the torsional MEMS device, and then the raw resonant frequency is compared to a standard resonant frequency. If the raw resonant frequency is less than the standard resonant frequency, at least one sacrificial element is removed from the torsional MEMS device for reducing the mass of the torsional MEMS device, and so that the raw resonant frequency is modulated approaching to the standard resonant frequency.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
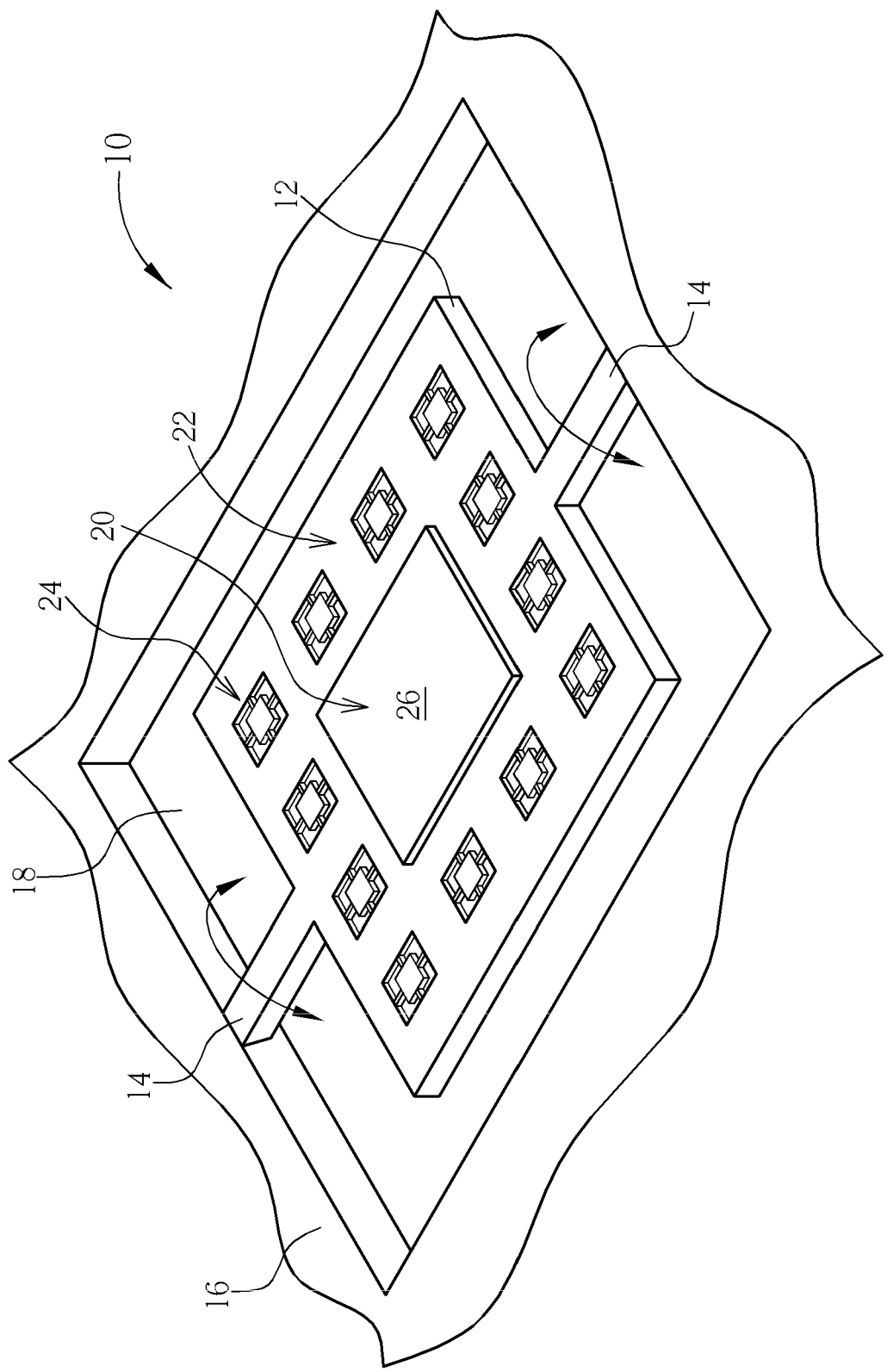
FIG. 1 and FIG. 2 are schematic diagrams illustrating a torsional MEMS device according to a preferred embodiment of the present invention.
Figure 2:
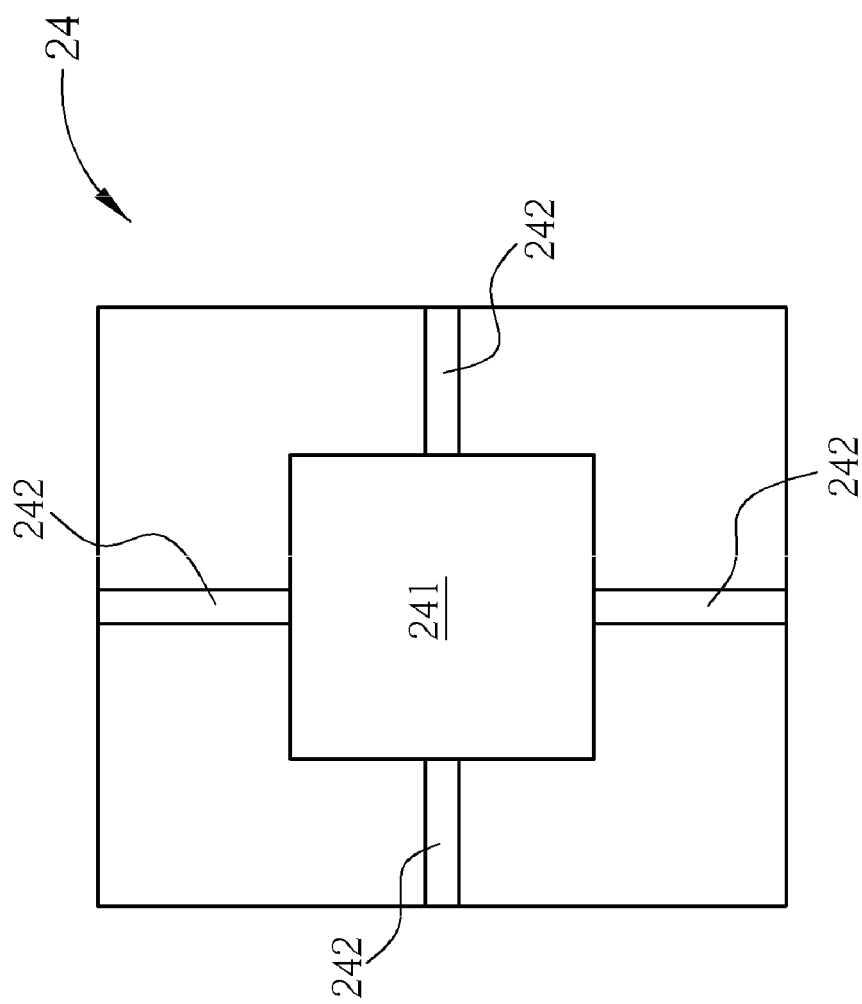

Please refer to FIG. 1 and FIG. 2. FIG. 1 and FIG. 2 are schematic diagrams illustrating a torsional MEMS device according to a preferred embodiment of the present invention. As shown in FIG. 1, a torsional MEMS device 10 having a platform 12 and two hinges 14 is provided. The hinges 14 are arranged along a first direction passing through the mass center of the platform 12, and are connected between the platform 14 and a support structure 16. The platform 12 is positioned in a space 18 of the support structure 16. The platform 12 is oscillated in the space 18 using the hinge 14 as the resonant axis.

An active area 20 and a non-active area 22 are positioned on a front surface of the platform 12. In the present embodiment, the non-active area 22 is disposed around the active area 20. A deposition process is performed to form a metal layer on the active area 20, including Ti/Au, Cr/Au, or Al, or a visible coating that the metal layer or the visible coating layer reflects light and acts as a mirror. A device or a component may be placed in the active area 20, such as a mirror 26 shown in the present embodiment, but is not limited to it. A MEMS device or an electrical circuit may also be placed in the active area 20 depending on the requirement of the product. Please refer to FIG. 1 in company with FIG. 2. The platform 18 further has a plurality of sacrificial elements 24 disposed in the non-active area 22. Each sacrificial element 24 includes a sacrificial mass 241 and at least a connecting bar. For example, four connecting bars 242 are used to connect the sacrificial mass 241 to the platform 18 of the present invention. The connecting bars 242 are used to stably bond the sacrificial mass 241 to the platform 18 without leading to extra torque during oscillation of the platform 18. In addition, the connected bars 242 also prevent sacrificial mass 241 from oscillating in a different resonant frequency from that of the platform 18. In addition, the number of the connecting bars 242 may be modified during the manufacturing processes of the torsional MEMS device 10, and the number of the connecting bars 242 is not limited to the present embodiment.

Figure 3:
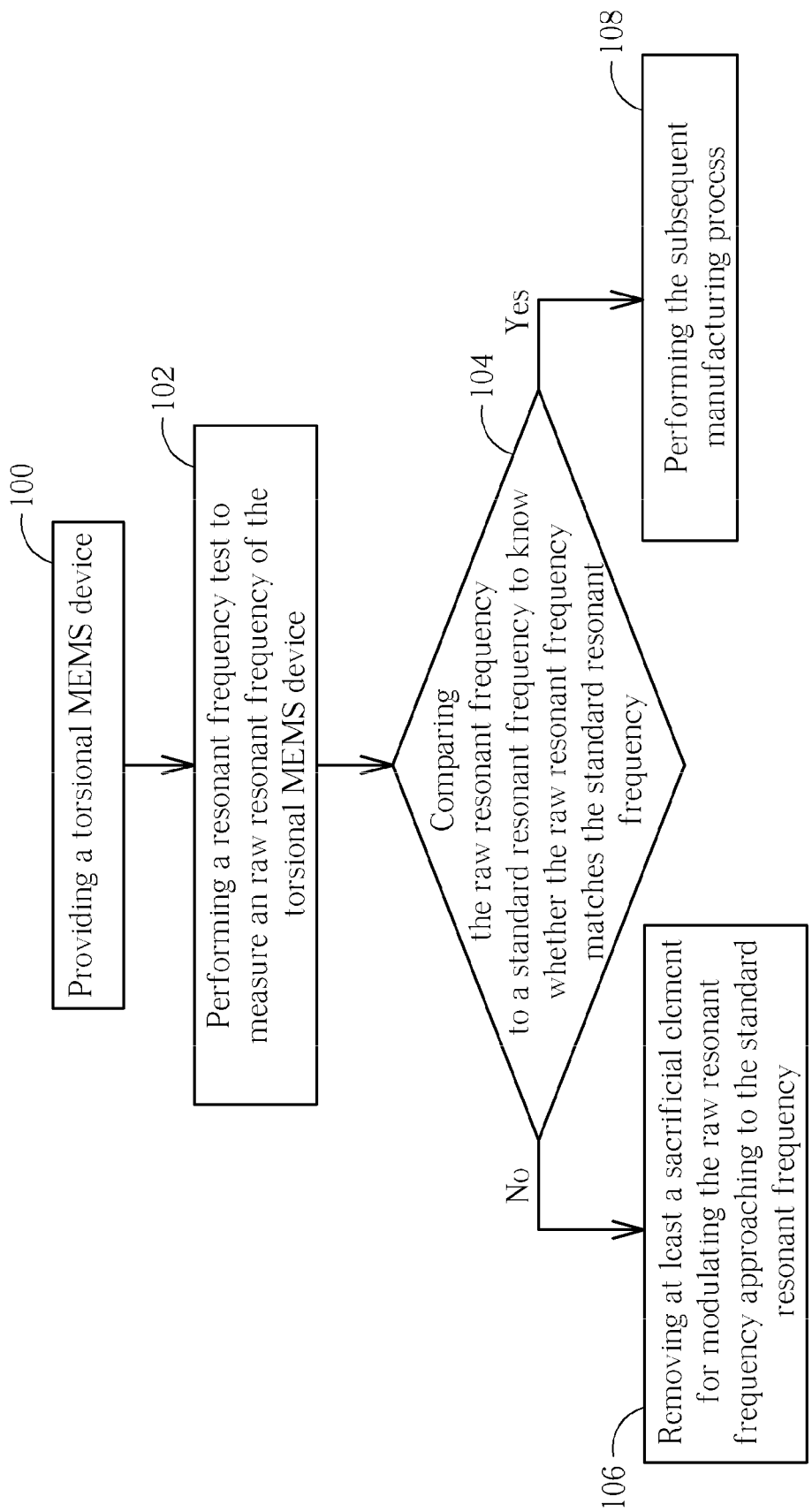
FIG. 3 is a flow diagram of a method for modulating the resonant frequency of the torsional MEMS device according to a preferred embodiment of the present invention.

Please refer to FIG. 3, which is a flow diagram of a method for modulating the resonant frequency of the torsional MEMS device according to a preferred embodiment of the present invention. The method of modulating the resonant frequency of the torsional MEMS device is performed after the manufacturing process of the torsional MEMS device. The method of modulating the resonant frequency of the torsional MEMS device is shown as follows.

Step 100: A torsional MEMS device is provided. The torsional MEMS device includes a support structure, a platform, and at least two hinges connecting the platform to the support structure. The platform has an active area, a non-active area, and a plurality of sacrificial elements disposed in the non-active area.

Step 102: A resonant frequency test is performed. A driving force is provided during the resonant frequency test to make the torsional MEMS device oscillate and to measure a raw resonant frequency of the hinge.

Step 104: The raw resonant frequency of the torsional MEMS device is compared to a standard resonant frequency to make sure of the raw resonant frequency match the range of the resonant frequency. The standard resonant frequency of the torsional MEMS device is determined depending on the product having the torsional MEMS device of the present invention therein.

If the raw resonant frequency of the torsional MEMS device is out of the range of the standard resonant frequency, for instance, the raw resonant frequency is less than the standard resonant frequency, Step 106 is subsequently performed.

Figure 4:
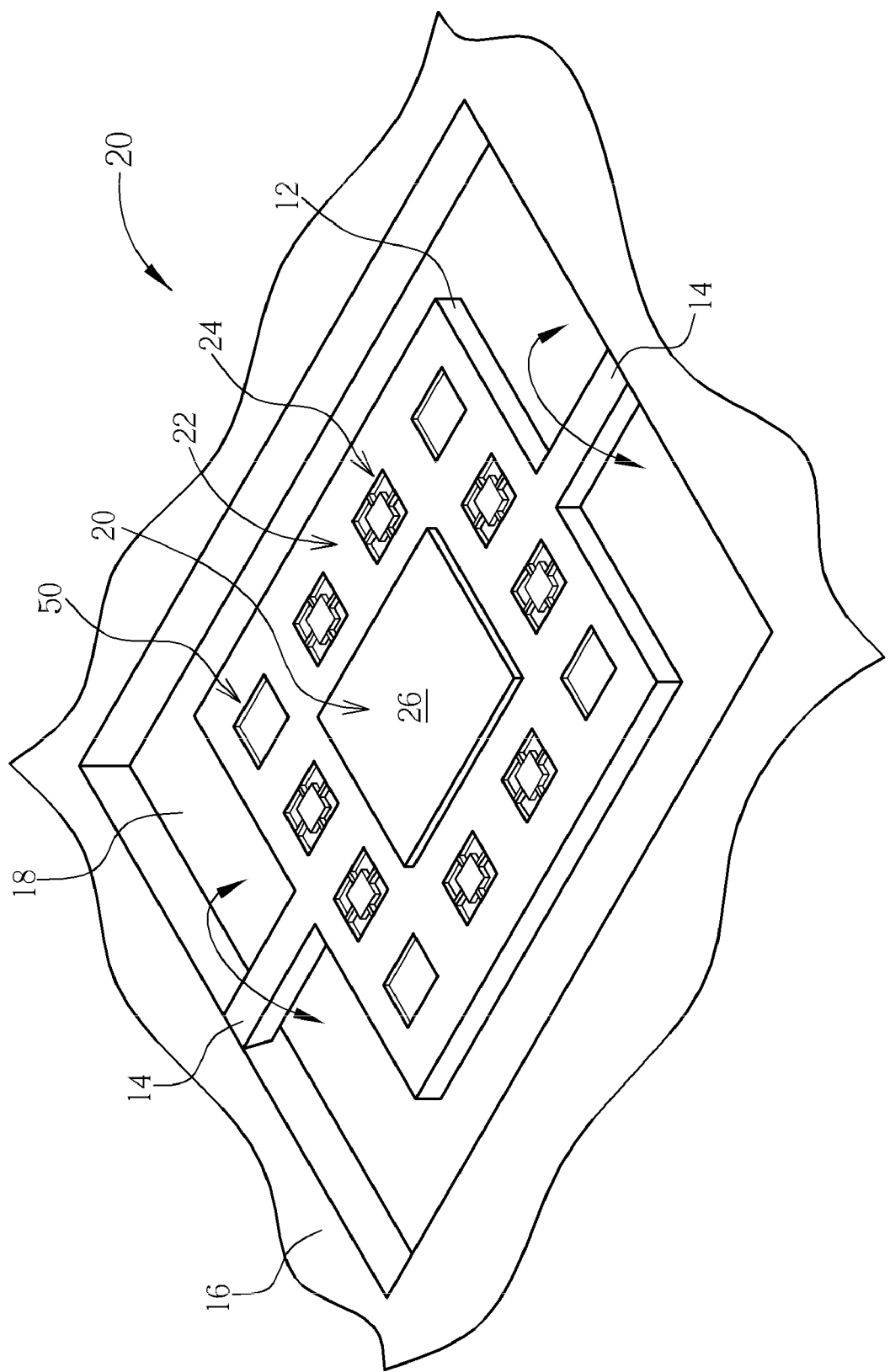
FIG. 4 shows a portion of the sacrificial elements are removed from the platform for modulating the resonant frequency of the torsional MEMS device.

Step 106: At least one sacrificial element 24 is removed to modulate the resonant frequency, better with the symmetric sacrificial element removing for the mass balance consideration to the platform 12, approaching to the standard resonant frequency. As shown in FIG. 4, the sacrificial mass 241 is removed from the non-active area 22 of the torsional MEMS device 10 using a laser or using external force or energy to break the connecting bars 242. Therefore, a hollow 50 is formed after the sacrificial element 24 is removed. As a result, the total mass of the torsional MEMS device 10 is reduced and therefore the raw resonant frequency is increased.

On the other hand, if the raw resonant frequency matches the standard resonant frequency, Step 108 is performed subsequently.

Step 108: The torsional MEMS device is transferred for the following processes, such as packaging or combining with other elements, for manufacturing electronic products having the torsional MEMS device therein.

During above-mentioned method, the driving force for oscillating the torsional MEMS device includes electromagnetic force, electrostatic force, heat, or piezoelectric force. The torsional MEMS device of the present invention may comprise a corresponding device depending on the driving force used for oscillation. For example, electromagnetic force is used for oscillating the torsional MEMS device of the present invention. A magnetic material disposed on a back surface of torsional MEMS device interacts with electromagnetic force generated by external metal coil, i.e., electromagnetic coil with the electrical control. The external metal coil is located under the magnetic material. The interaction between magnet material and electromagnetic force generated by the metal coil oscillates the torsional MEMS device. The magnetic material may be assembled to the torsional MEMS device after the manufacturing process of the torsional MEMS device is finished, or may use deposition or electroplating process to process the metal with magnetic property on the desired area of the back surface of the torsional MEMS device.

Figure 5:
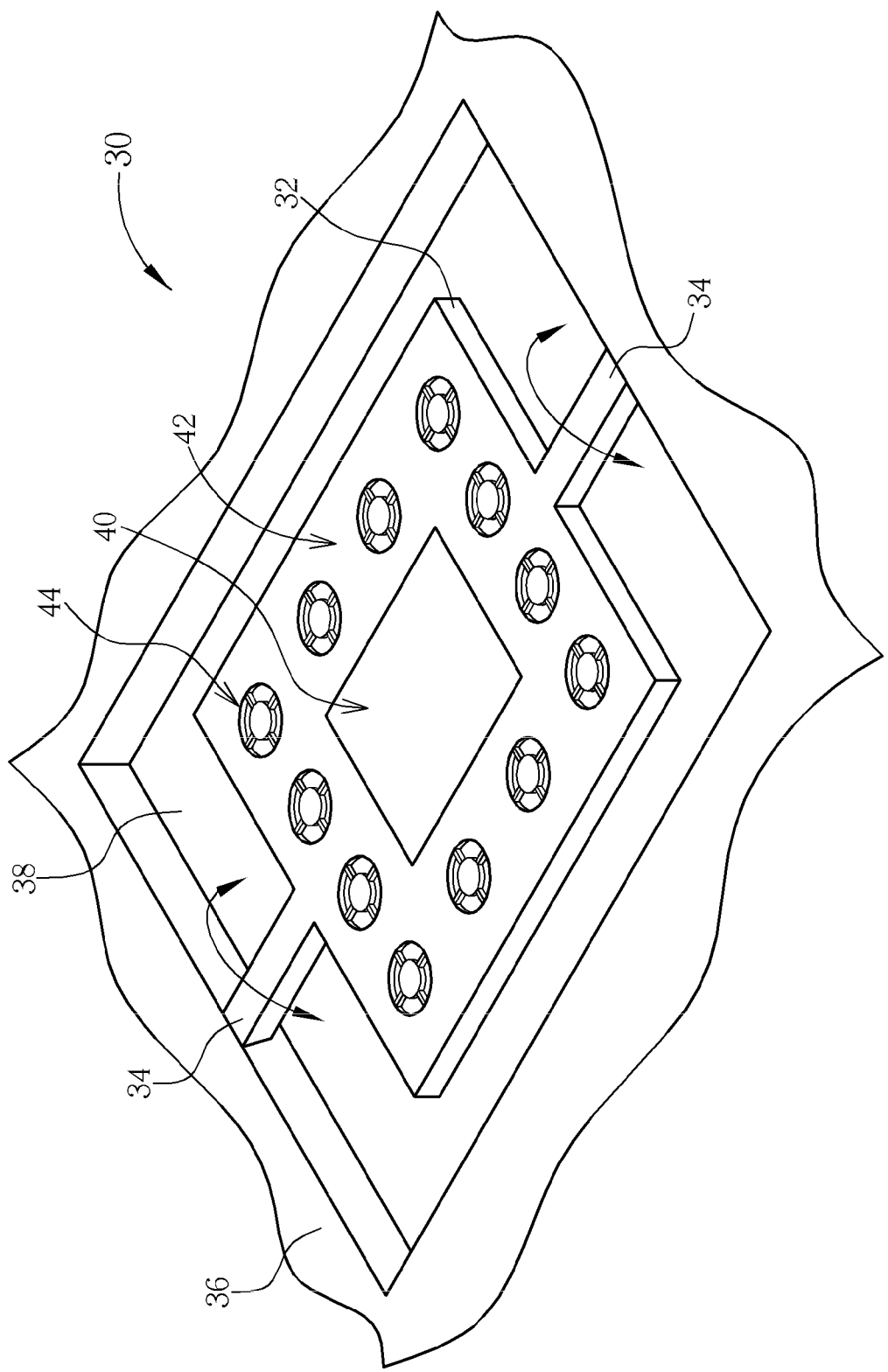
FIG. 5 and FIG. 6 are schematic diagram of a torsional MEMS device according to another preferred embodiment of the present invention.
Figure 6:
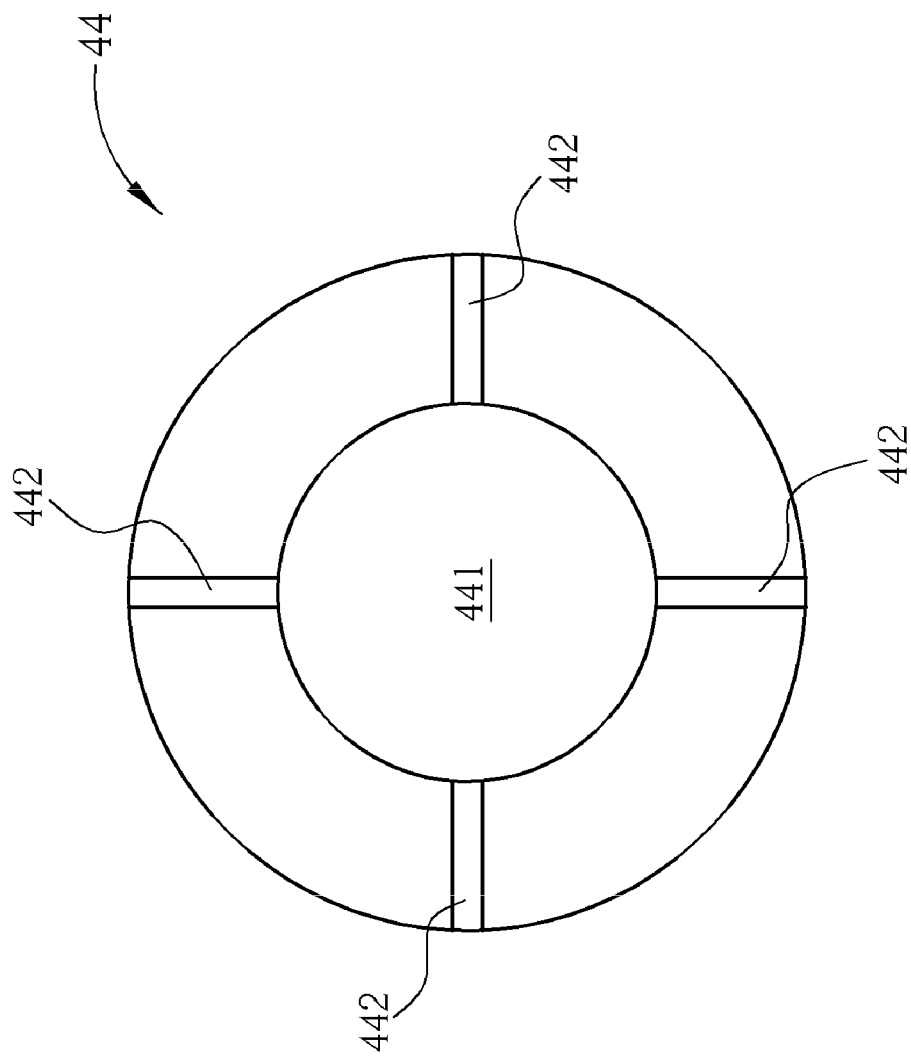

Please refer to FIG. 5 and FIG. 6, which are schematic diagram of a torsional MEMS device 30 according to another preferred embodiment of the present invention. The torsional MEMS device 30 having a support structure 36, a platform 32 and at least two hinges 34 is provided. The hinges 34 are arranged along a first direction passing through the mass center of the platform 32, and are connected between the platform 32 and the support structure 36. The platform 32 is positioned in a space 38 of the support structure 36. The platform 32 is oscillated in the space 38 using the hinge 34 as the resonant axis. An active area 40 and a non-active area 42 are positioned on a front surface of the platform 32. A plurality of sacrificial elements 44 disposed in the non-active area 42. Each sacrificial element 44 includes a sacrificial mass 441 and at least a connecting bar. For example, four connecting bars 442 are used to connect the sacrificial mass 441 to the platform 32 of the present invention. The shape of the sacrificial element 44 of the present embodiment is modified as a round-shaped sacrificial element in contrast to the rectangular-shaped sacrificial element 24 of the prior embodiment. The function of the sacrificial element is to change the mass of the torsional MEMS device for modulating the resonant frequency and is affected by the shape of the sacrificial elements. Furthermore, the position, the connecting relationship, and the function of the components of the torsional MEMS device 30 are similar to those of the torsional MEMS device 10. Detailed description of these components is illustrated in the prior embodiment.

The torsional MEMS device of the present invention may be manufactured by a series of semiconductor processes, such as a lithography process, an etch process, a grinding process, and a CMP process. The pattern of the platform, the hinges, and the sacrificial elements may be defined on the silicon wafers by the same mask. When the torsional MEMS device is formed on a wafer, it can be measured the resonant frequency. If the torsional MEMS device is formed on a normal wafer, which has a plurality of the same torsional MEMS device thereon, and has free space for its free torsion, which means that the torsional MEMS device is suspending without constraint on the wafer, the resonant frequency measurement and resonant frequency modulation of the torsional MEMS devices formed on a normal wafer are performed in a wafer-level scale. The raw resonant frequency of the respective torsional MEMS device may be modulated individually but the wafer still keeps as the wafer-level scale. When the torsional MEMS device is formed on a thin wafer and there is no free space for the torsional MEMS device to resonate, which means that the torsional MEMS device is fixed on the wafer even after etch through process, the resonant frequency of the hinge of the torsional MEMS device may be measured and modulated after these devices are divided individually. In other words, each torsional MEMS device is measured and modulated in a chip-level scale.

In conclusion, the present invention provides a torsional MEMS device capable of modulating the resonant frequency thereof. After the resonant frequency test is performed, the raw resonant frequency is compared to the standard resonant frequency. If the raw resonant frequency is less than the standard resonant frequency, at least one sacrificial element is removed depending on the position of the sacrificial element and the balance of the platform. Laser or an external force is used to break the connecting bars and subsequently the sacrificial element is removed. Accordingly, the total mass of the torsional MEMS device is reduced and the resonant frequency is increased. The abnormal torsional MEMS device is prevented from scrapping after the removal of the sacrificial element, and therefore, the yield of the product is increased. Furthermore, the position of the sacrificial elements is not limited to the preferred embodiments of the present invention. The sacrificial elements may be disposed in a place on the platform without hindering the performance of the devices disposed in the active area. The device disposed in the active area is not limited to the mirror shown in the present embodiments. Mechanical structures, sensors, or electrical circuits may be disposed in the active area depending on the final product having the torsional MEMS device therein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of modulating the resonant frequency of a torsional MEMS device, comprising:
   providing a torsional MEMS device, the torsional MEMS device comprising a support structure, a platform, and at least two hinges connecting the support structure and the platform, in which the platform comprises an active area and a non-active area, wherein a plurality of sacrificial elements is disposed in the non-active area;
   performing a resonant frequency test to measure a raw resonant frequency of the torsional MEMS device, and comparing the raw resonant frequency to a standard resonant frequency; and
   removing at least one sacrificial element from the torsional MEMS device if the raw resonant frequency is less than the standard resonant frequency to modulate the raw resonant frequency approaching to the standard resonant frequency.

2. The method of claim 1, wherein each of the sacrificial elements comprises a sacrificial body and at least a connecting bar connecting the sacrificial body and the platform.

3. The method of claim 2, wherein the step of removing the sacrificial layer is performed by using a laser to melt the connecting bar for removing the sacrificial body from the non-active area of the torsional MEMS device.

4. The method of claim 2, wherein the step of removing the sacrificial layer is performed by using an external force to break connecting bar for removing the sacrificial body from the non-active area of the torsional MEMS device.

5. The method of claim 1, wherein the platform oscillates along the hinges, which is the resonant axis of the platform.

6. The method of claim 1, wherein the non-active area is positioned around the active area.

7. The method of claim 1, wherein the platform further comprises a mirror disposed in the active area.

8. The method of claim 1, wherein the torsional MEMS device is formed on a normal wafer, which comprises a plurality of torsional MEMS device, and the measurement and the modulation of the raw resonant frequency of the raw resonant frequency of the torsional MEMS devices are performed in a wafer-level scale.

9. The method of claim 1, wherein the torsional MEMS device is formed on a thin wafer, which comprises a plurality of torsional MEMS device, and the measurement and the modulation of the raw resonant frequency of the raw resonant frequency of the torsional MEMS device are performed in a chip-level scale.

10. The method of claim 1, wherein the sacrificial element is removed symmetrically for maintaining the mass balance of the platform.

* * * * *